(12) United States Patent
Zillich

(10) Patent No.: US 10,518,424 B2
(45) Date of Patent: Dec. 31, 2019

(54) PROTECTION METHOD AND PROTECTION DEVICE FOR A HANDLING APPARATUS

(71) Applicant: Blue Danube Robotics GmbH, Vienna (AT)

(72) Inventor: Michael Zillich, Vienna (AT)

(73) Assignee: BLUE DANUBE ROBOTICS GMBH, Vienna (AT)

( * ) Notice: Subject to any disclaimer, the term of this patent is extended or adjusted under 35 U.S.C. 154(b) by 414 days.

(21) Appl. No.: 15/322,679

(22) PCT Filed: Jun. 30, 2015

(86) PCT No.: PCT/AT2015/000094
§ 371 (c)(1),
(2) Date: Dec. 28, 2016

(87) PCT Pub. No.: WO2016/000005
PCT Pub. Date: Jan. 7, 2016

(65) Prior Publication Data
US 2017/0136633 A1    May 18, 2017

(30) Foreign Application Priority Data
Jul. 3, 2014  (AT) .............................. A 50463/2014

(51) Int. Cl.
| | |
|---|---|
| G01C 21/00 | (2006.01) |
| B25J 19/06 | (2006.01) |
| B25J 9/16 | (2006.01) |
| B25J 13/08 | (2006.01) |
| B25J 19/00 | (2006.01) |
| F16P 3/12 | (2006.01) |

(52) U.S. Cl.
CPC ........... *B25J 19/063* (2013.01); *B25J 9/1676* (2013.01); *B25J 13/086* (2013.01); *B25J 13/087* (2013.01);
(Continued)

(58) Field of Classification Search
CPC ...... B25J 19/063; B25J 13/086; B25J 9/1676; B25J 19/06; B25J 19/0091; B25J 19/0079; B25J 13/087; F16P 3/12; F16P 3/142
See application file for complete search history.

(56) References Cited

U.S. PATENT DOCUMENTS 9,452,531 B2 *  9/2016  Kikkeri ................. B25J 9/1676
10,065,316 B2 *  9/2018  Sussman ............... B25J 9/1676
(Continued)

FOREIGN PATENT DOCUMENTS

DE           102 52 069 A1      5/2004
DE      10 2006 044 071 A1      4/2008
(Continued)

OTHER PUBLICATIONS

JP2010-105057 in view of JPO English Translation (Year: 2010).*
International Search Report for PCT/AT2015/000094 dated Dec. 12, 2015; English translation submitted herewith (7 pages).

*Primary Examiner* — Ian Jen
(74) *Attorney, Agent, or Firm* — Fitch, Even, Tabin & Flannery, LLP

(57) ABSTRACT

The method and a device are for protecting persons and stationary or autonomously moving obstacles in front of stationary or autonomously moving handling apparatuses such as manufacturing, transport, inspection or service robots and their manipulators from collisions within their workspace by pressure sensors in protective covers filled with medium in such a manner that the medium is not supplied to each individual protective element from outside, but the protective elements in their interior, in addition to a pressure sensor, also comprise a pressure-increasing device, which sucks in the medium, preferably ambient air, and
(Continued)

generates a pressure in the interior of the protective element, which is adjustable from a control device.

20 Claims, 4 Drawing Sheets

(52) U.S. Cl.
CPC ....... *B25J 19/0079* (2013.01); *B25J 19/0091* (2013.01); *F16P 3/12* (2013.01)

(56) References Cited

U.S. PATENT DOCUMENTS

| | | | | |
|---|---|---|---|---|
| 10,095,991 | B2* | 10/2018 | Kanamaru | B25J 9/1676 |
| 2003/0160520 | A1* | 8/2003 | Gloden | B25J 19/063 |
| | | | | 307/326 |
| 2006/0181092 | A1* | 8/2006 | Kikut | B25J 15/0052 |
| | | | | 294/2 |
| 2014/0025204 | A1* | 1/2014 | Schlaich | B25J 9/1676 |
| | | | | 700/255 |
| 2019/0047160 | A1* | 2/2019 | Weitschat | B25J 15/00 |

FOREIGN PATENT DOCUMENTS

| | | | |
|---|---|---|---|
| DE | 10 2007 062 245 A1 | 6/2009 | |
| EP | 1 810 795 A1 | 7/2007 | |
| EP | 1810795 A1 * | 7/2007 | ............ B25J 19/063 |
| JP | S60-218122 A | 10/1985 | |
| JP | S61-33894 | 2/1986 | |
| JP | S63-39786 | 2/1988 | |
| JP | H09-285992 A | 11/1997 | |
| JP | 2010-105057 A | 5/2010 | |

* cited by examiner

PROTECTION METHOD AND PROTECTION DEVICE FOR A HANDLING APPARATUS

CROSS-REFERENCE TO RELATED APPLICATIONS

This application is a U.S. national phase application filed under 35 U.S.C. § 371 of International Application No. PCT/AT2015/000094, filed Jun. 30, 2015, designating the United States, and claims priority from Austrian Patent Application No. A 50463/2014, filed Jul. 3, 2014, and the complete disclosures of which applications are hereby incorporated herein by reference in their entirety for all purposes.

FIELD OF THE INVENTION

The invention relates to a method and a device for protecting persons and stationary or autonomously moving obstacles in front of stationary or autonomously moving handling apparatuses such as manufacturing, transport, inspection or service robots and their manipulators from collisions within their workspace by protective covers including internal pressure sensors and an integrated pressure increasing and pressure maintaining device.

BACKGROUND

From DE 10 2007 062 245 A1, a collision detection device surrounding the movable elements of the handling apparatus with media storages made of flexible material is known. The media storages are equipped with pressure sensors, which indicate a pressure increase upon collision and can be used to trigger protective circuits.

From EP 1 810 795 A1, a safety device is known, in which elastic, sealed, gas-filled protective covers surround the manipulators of a robot, which are equipped with one or several pressure sensors to be used in conjunction with a reference sensor for triggering protective circuits.

From DE 10 2006 044 071 B4, a robot protection device is known, in which elastic protective covers likewise surround the manipulator(s) to damp impacts, and a change in the pressure of said protective covers in the case of collision is detected by pressure sensors.

SUMMARY

All these approaches have in common that they require an external feed source for filling the protective covers with a gas or fluid, thus involving complex hose tubings restricting the mobility of the manipulators, in particular with a plurality of covers. The handleable number of individual protective covers is thus limited, and hence their application in autonomously moving robots is restricted.

Since a pressure increase upon collision will be more striking in protective covers having small volumes than with large-volume protective covers, the height of the ideal feed pressure of the medium in the protective cover will thus also depend on its size.

It has, therefore, proved to be advantageous to provide a plurality of small protective elements rather than a few large-volume protective covers. This offers the additional advantage that their shapes can be adapted to the shape of the surface of the robot and its manipulators. Also the protection of their extremely collision-endangered zones can be better realized, in particular with autonomous robots.

The size of the protective covers, their shapes and the pressure prevailing in their interiors also defines their dimensional stability.

Since even the shape of the protective elements has a clear impact on the height of the ideal feed pressure of the medium in the protective cover, the subdivision of the protective covers into smaller protective elements will practically only be feasible if each of the protective elements is assigned a pressure ideal for its shape and size.

BRIEF DESCRIPTIONS OF THE DRAWINGS

The invention will be explained in more detail by way of an exemplary embodiment according to the accompanying drawings, wherein.

DETAILED DESCRIPTION

Figure 1:
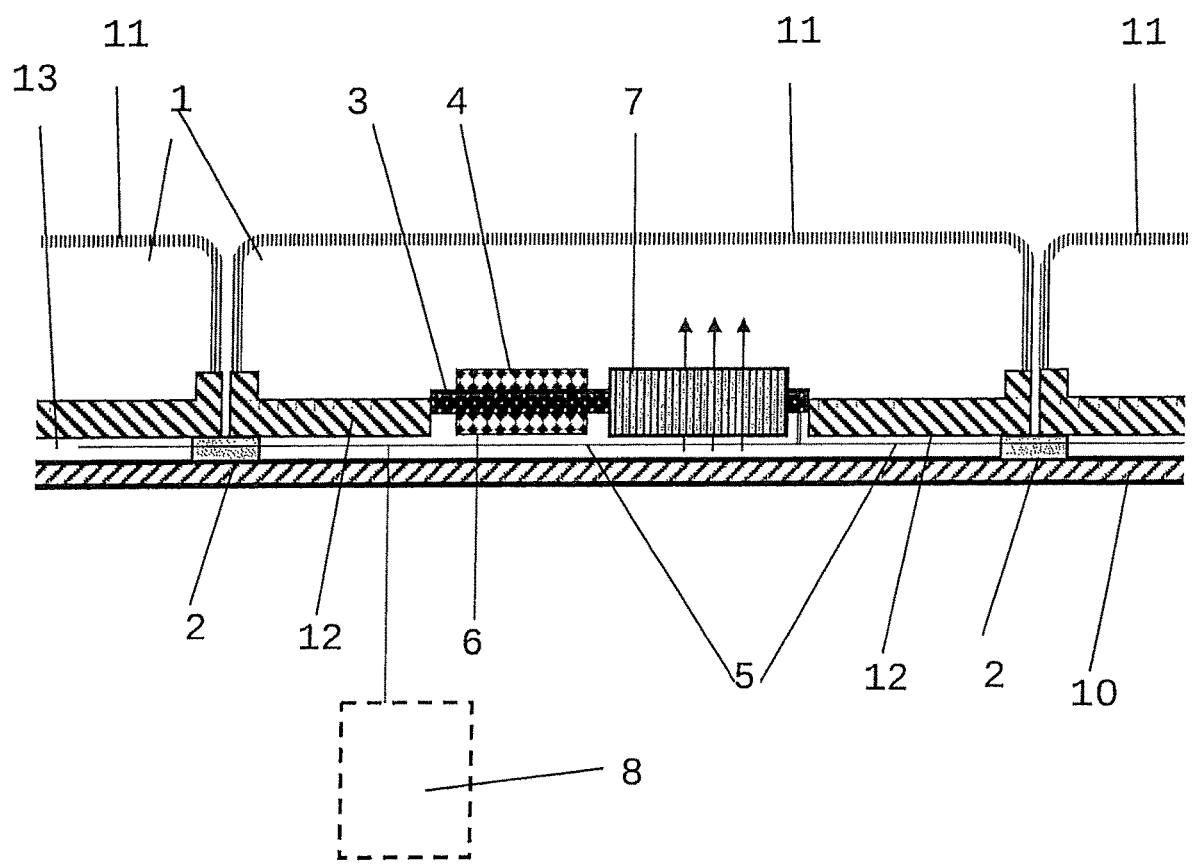
FIG. 1 depicts protective elements with their base shells, without foam fillings.

According to the invention, the object as illustrated in cross section in FIG. 1 is achieved in that the medium is not supplied to each protective element 1 from outside, but the protective elements in their interiors, in addition to at least one pressure sensor 4, each also comprise a pressure-increasing device 7, which sucks in the medium, preferably ambient air, and generates a pressure in the interior of the protective element, which is adjustable from a control device 8.

As illustrated in FIG. 1, a preferred configuration according to the invention of the device comprising protective elements 1 typically consists of base shells 12 made of plastic, an air inlet and cable passage channel 13 kept clear by spacers 2, the pressure-increasing devices 7, the at least one pressure sensors 4 with or without reference sensors 6, and elastic covers 11 for the protective elements.

In a further preferred configuration according to the invention of the device comprising protective elements 1 as illustrated in FIG. 1, the, for instance piezoelectric, pressure-increasing device 7, the at least one internal pressure sensor 4, and optionally the at least one external pressure sensor 6, are mounted on a mounting plate 3 designed as a printed circuit board and glued into the base shell.

The internal pressure-increasing device 7 also offers some protection against injury to the elastic protective cover 11 of the protective element 1 by automatically compensating for small injuries to the elastic protective cover, or leakages.

The power supply cable and data lines 5 of the pressure-increasing pump and the pressure sensors are led to the control device 8 in grooves 13 below the base plate via a collective channel.

The power supply of the integrated pressure-increasing device 7 is preferably effected by electric power fed on demand via a control device 8 arranged outside the protective elements 1.

Said control device 8 can be designed as an analog controller or as a digital controller. As appropriate, actuation of the pressure-increasing devices 7 can be effected individually or in groups. The individual combination of actuation algorithms for each of the protective elements is also possible.

The configuration according to the invention of the protective elements 1 comprising internal pressure-increasing devices 7 can be controlled via the control device 8 according to a default pressure profile or also by a pulsed pressure increase.

The pressure-increasing device 7 is preferably designed as a piezoelectric pump.

Figure 2:
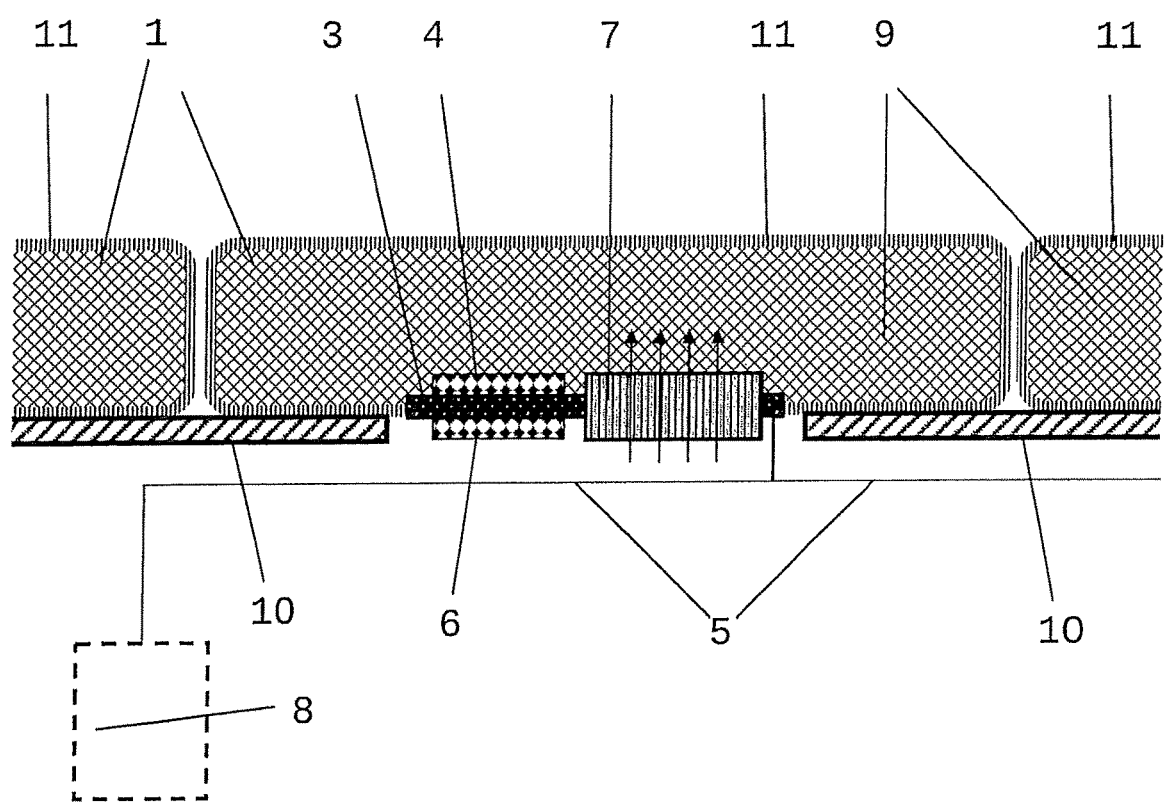
FIG. 2 depicts directly mounted protective elements with foam fillings in cross section.

As illustrated in FIG. 2, the inner fillings 9 of the protective elements 1 in a further preferred configuration can be supplemented with open-pore foam fillers 9 to enhance the dimensional stability and the attenuation effect, thus providing an inherent elasticity of the protective elements 1 at a collision.

Another variant of the configuration of the device comprising protective elements 1 consists in that the foam filling 9 is gas-tightly covered by an outer cover 11 of cured liquid plastic, said cover being applied by painting, spraying or dip-coating. The mounting plate 3 described in the preceding passage, which is designed as a printed circuit board, is subsequently glued into said outer cover 11 together with the piezoelectric pressure-increasing device 7, the internal pressure sensor 4, and optionally the external pressure sensor 6.

The gas-tight outer cover 11 can be made of elastic materials having different properties adapted to the respective application, e.g. high-temperature-resistant, refractory, anti-bacterially coated, or even in different colors for purposes of distinction, alarm or design. Its layer thickness is variable, typically ranging between 20 μm and 2 mm.

In another preferred configuration variant, the parts comprising the protective cover 11 and the foam filling 9 are made of a material forming a gas-tight outer skin with a gas-permeable inner structure in the production, such as microcellular rubber or integral foam.

A further preferred configuration of the device comprising protective elements 1 consists in that a shape adapted to the surface of the robot or manipulator 10 to be protected is used. This configuration can be used for respective surfaces, e.g. as plane or slightly curved flat cushions, half-shells for cladding cylindrical or conical pipe parts, and round manipulator elements. The fastening of the protective elements to the base shells of plastic is effected by gluing, magnetic fastening or fastening lugs for fastening screws.

Figure 3:
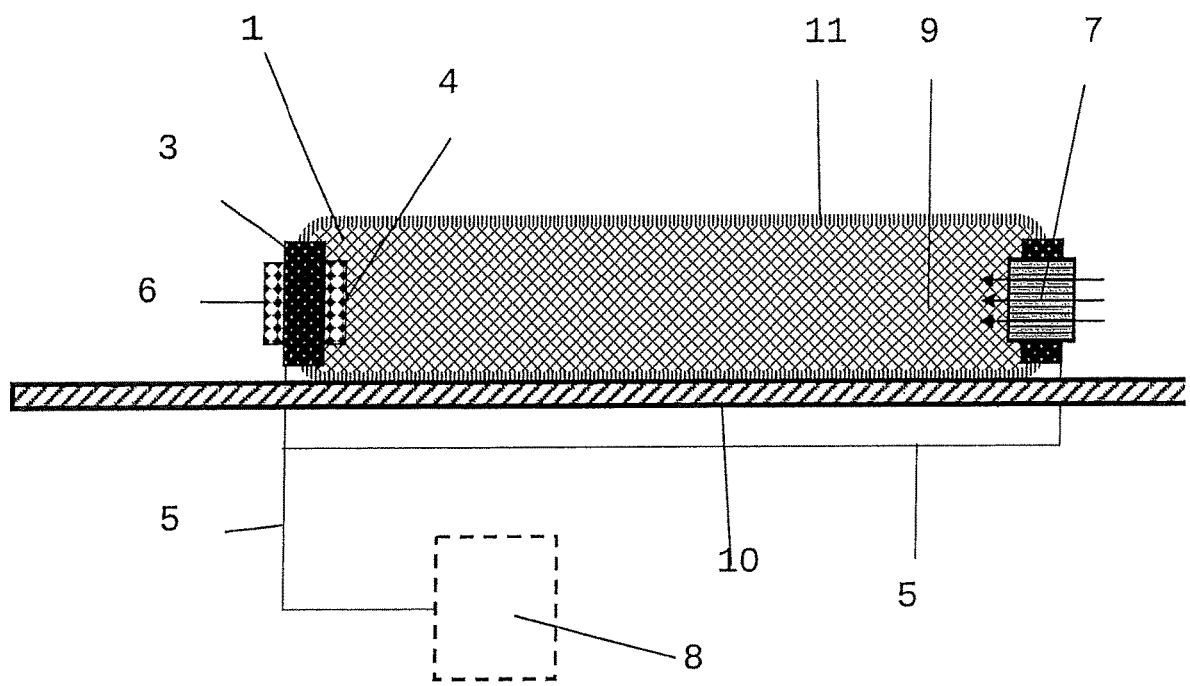
FIG. 3 depicts a directly mounted protective element with a foam filling and laterally arranged sensor and pressure-increasing device in cross section.
Figure 4:
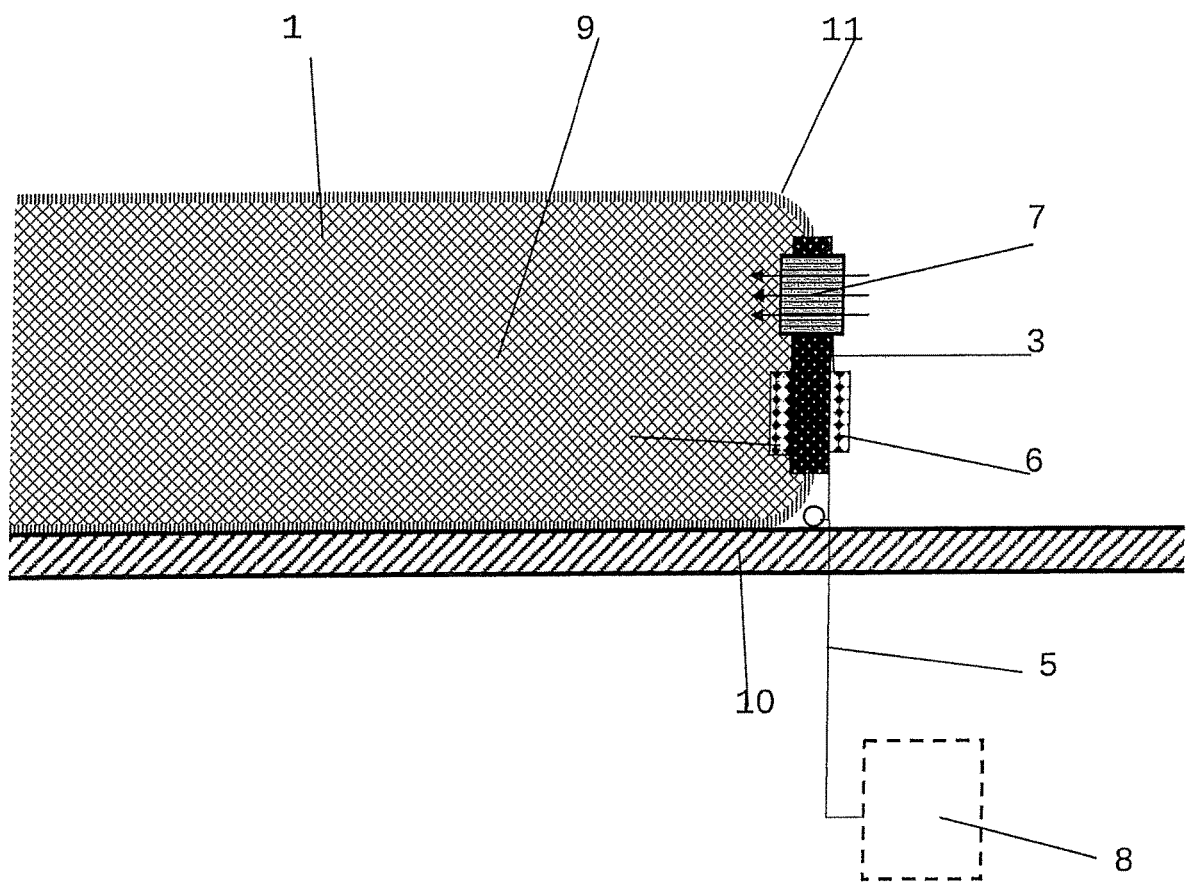
FIG. 4 depicts a directly mounted protective element with a foam filling and the joint lateral arrangement of the sensor and the pressure-increasing device in cross section.

The design of the protective elements 1 can also be realized as illustrated in cross section in FIGS. 3 and 4. There, the internal pressure sensors 4, the external pressure sensors 6 and the pressure-increasing device 7 are arranged laterally on the protective elements. This can be done on any side of the protective elements 1 either separately or, as illustrated in the cross section of FIG. 4, on a common base plate, which is preferably designed as a printed circuit board.

A further preferred configuration of the device comprising protective elements 1 consists in that it is used as a spherical or mushroom pushbutton for switching operations, e.g., typically an emergency mushroom pushbutton, or in an elongate strip form for safety circuits in clamping strips.

The device and options of combination of its configuration variants in terms of shape and size allow for the control of different counter-measures at a risk of collision by suitably programming the control device 8. In particular, this encompasses emergency shutdowns, proximity control via the pressure gradient, proximity control by capacitive proximity sensors in combination with the protective element according to the invention as a contact sensor, preferably in that the concerned protective element is more strongly inflated while being approached so as to increase the protective effect.

Similarly, the combination of a control of the surface of the manipulator 10 to be protected by the protective elements according to the invention as contact sensor with a three-dimensional camera forming spatial images is envisaged. This, in particular, for securing the final approach distance of the manipulator of about 1 to 3 cm, which cannot or hardly been seized by a camera forming three-dimensional images, and hence has to be covered by the manipulator at creep speed.

The invention claimed is:

1. A method for protecting persons and stationary or autonomously moving obstacles in front of a stationary or autonomously moving handling apparatus, which comprises a manufacturing, transport, inspection or service robots and a manipulator of the stationary or autonomously moving handling apparatus, from collisions within the workspace by protective element(s) each having an interior and a protective covers, one or several internal pressure sensors, and an internal pressure increasing device, characterized in that in the method comprises supplying a medium for inflating a protective cover to each individual protective element, provided the medium is not supplied under pressure from outside; and generating excess pressure within the interior for inflating the protective cover of the respective protective element with the medium using the internal pressure increasing device in addition to the one or several pressure sensor(s).

2. A method according to claim 1, characterized in that the medium comprises ambient air, the protective element having suction channels, and said method further comprises sucking said medium in the protective element through the suction channels, and generating a pressurized medium in the interior of the protective element at a pressure adjustable by a control device.

3. A method according to claim 1, characterized in that an on demand power supply is operably connected to the internal pressure increasing device, wherein said method further comprises actuating the on demand power supply of the integrated pressure-increasing device via a control device arranged outside the protective elements.

4. A method according to claim 2, characterized in that said control device comprises an analog controller or a digital controller.

5. A method according to claim 4, characterized in that said control device is designed as a digital controller.

6. A method according to claim 4, characterized in that in said method further comprises actuating the pressure-increasing devices individually or in groups using said control device.

7. A method according to claim 2, characterized in that the method further comprises controlling the pressure-increasing devices by the control device according to a default pressure profile or in a pulsed manner.

8. A method according to claim 2, characterized in that the method further comprises controlling the pressure-increasing device via an individual combination of actuation algorithms for each of the protective elements.

9. A method according to claim 1, characterized in that the method further comprises, in combination with capacitive proximity sensors, increasing inflating only the concerned protective element that is at risk of collision to an increased pressure, to thereby increase the protective effect.

10. A method according to claim 1, characterized in that the method further comprises, in combination with the digital, three-dimensional detection of the surface shape of a collision object or a person at risk of collision, increasing inflating only the respectively concerned protective element that is at a risk of collision to an increased pressure, to thereby increase the protective effect.

11. A method according to claim 1, characterized in that the stationary or autonomously moving handling apparatus comprises a robot and/or a manipulator for the stationary or autonomously moving handling apparatus, and the method further comprises, in combination with the digital, three-dimensional detection of the surface shape of a collision object or a person at risk of collision, controlling the movements of the robot and/or the manipulator using a control device in such a manner that the approach speed of the robot and/or the manipulator is reduced to a safe measure.

12. A device for protecting persons and stationary or autonomously moving obstacles in front of a stationary or autonomously moving handling apparatus that comprises a manufacturing, transport, inspection or service robot and a manipulator of the stationary or autonomously moving handling apparatus from collisions within the their workspace by protective elements that have an interior, the protective elements comprise inflatable protective covers and include at least one internal pressure sensor, and an internal pressure increasing device, characterized in that the medium for inflating a protective cover is not supplied to each individual protective element under pressure from outside, but the excess pressure is generated within the interior of the protective element using the internal pressure increasing device in addition to the at least one pressure sensor.

13. A device according to claim 12, characterized in that the protective elements each comprise an inner filling that is comprised of an open-pore foam.

14. A device according to claim 12, characterized in that the device further comprises spacers to keep the air entry and cable-passage channel clear.

15. A device according to claim 12, characterized in that the pressure-increasing device, the internal pressure sensor(s), and optionally the external pressure sensor(s), are mounted on a mounting plate designed as a joint printed circuit board.

16. A device according to claim 12, characterized in that the protective elements each comprise a foam filling that is gas-tightly covered by an outer cover of cured liquid plastic, said cover being applied by painting, spraying or dip-coating.

17. A device according to claim 12, characterized in that the protective elements each comprises a foam filling made of a material that forms a gas-tight outer skin with a gas-permeable inner structure.

18. A device according to claim 16, characterized in that the gas-tight outer cover is comprised of a high-temperature-resistant or antibacterial coating.

19. A device according to claim 12, characterized in that the device is used in a spherical, mushroom or elongate configuration as a pushbutton for switching operations.

20. A method for protecting persons and stationary or autonomously moving obstacles in front of a stationary or autonomously moving handling apparatus and/or a manipulator for the stationary or autonomously moving handling apparatus from collisions within their workspace by protective elements having respective inflatable protective covers, and the protective element(s) having suction channels, wherein the method includes
- providing a medium for inflating to each individual protective element by sucking said medium into the protective element(s) through the suction channels, provided that the medium is not provided under pressure from outside the protective element, each protective element having an interior, one or more internal pressure sensors disposed within the interior, an internal pressure increasing device disposed within the interior, and the inflatable protective cover over the interior, and wherein the medium for inflating comprises ambient air;
- detecting the surface shape of a collision object or a person at risk of collision and generating a pressurized medium in the interior of the protective element(s) with the internal pressure increasing device, which sucks the medium through the suction channels into the interior, to inflate the protective cover(s) with the pressurized medium, wherein the pressure is adjustable by a control device; and
- controlling the pressure-increasing device by the control device according to a default pressure profile or in a pulsed manner.

\* \* \* \* \*